US012296265B1

(12) United States Patent
Gupta et al.

(10) Patent No.: US 12,296,265 B1
(45) Date of Patent: May 13, 2025

(54) SPEECH PROSODY PREDICTION IN VIDEO GAMES

(71) Applicant: Electronic Arts Inc., Redwood City, CA (US)

(72) Inventors: Kilol Gupta, Redwood City, CA (US); Zahra Shakeri, Newark, CA (US); Gordon Durity, Surrey (CA); Mohsen Sardari, Burlingame, CA (US); Harold Chaput, Castro Valley, CA (US); Navid Aghdaie, San Jose, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 18/407,686

(22) Filed: Jan. 9, 2024

Related U.S. Application Data

(63) Continuation of application No. 16/953,801, filed on Nov. 20, 2020, now abandoned.

(51) Int. Cl.
*A63F 13/54* (2014.01)
*G06F 3/16* (2006.01)
(Continued)

(52) U.S. Cl.
CPC ................ *A63F 13/54* (2014.09); *G06F 3/16* (2013.01); *G06N 3/08* (2013.01); *G10L 13/02* (2013.01);
(Continued)

(58) Field of Classification Search
CPC .... A63F 13/54; A63F 2300/6081; G06F 3/16; G06N 3/08; G10L 13/02; G10L 19/04; G10L 25/30; G10L 25/51
See application file for complete search history.

(56) References Cited

U.S. PATENT DOCUMENTS 10,249,289 B2 * 4/2019 Chun ................... G10L 13/027
10,600,404 B2 * 3/2020 Garcia ................. G10L 13/033
(Continued)

OTHER PUBLICATIONS

Arik, Sercan O., et al. "Neural Voice Cloning with a Few Samples." arXiv preprint arXiv:1802.06006 (2018), Retrieved from https://arxiv.org/abs/1802.06006v3.
(Continued)

*Primary Examiner* — Malina D. Blaise
(74) *Attorney, Agent, or Firm* — Gray Ice Higdon

(57) ABSTRACT

This specification describes a computer-implemented method of generating context-dependent speech audio in a video game. The method comprises obtaining contextual information relating to a state of the video game. The contextual information is inputted into a prosody prediction module. The prosody prediction module comprises a trained machine learning model which is configured to generate predicted prosodic features based on the contextual information. Input data comprising the predicted prosodic features and speech content data associated with the state of the video game is inputted into a speech audio generation module. An encoded representation of the speech content data dependent on the predicted prosodic features is generated using one or more encoders of the speech audio generation module. Context-dependent speech audio is generated, based on the encoded representation, using a decoder of the speech audio generation module.

20 Claims, 9 Drawing Sheets

(51) Int. Cl.
  *G06N 3/08* (2023.01)
  *G10L 13/02* (2013.01)
  *G10L 19/04* (2013.01)
  *G10L 25/30* (2013.01)
  *G10L 25/51* (2013.01)

(52) U.S. Cl.
  CPC .............. *G10L 19/04* (2013.01); *G10L 25/30* (2013.01); *G10L 25/51* (2013.01); *A63F 2300/6081* (2013.01)

(56) References Cited

U.S. PATENT DOCUMENTS

| | | | |
|---|---|---|---|
| 11,605,388 B1* | 3/2023 | Gupta | A63F 13/424 |
| 2015/0012277 A1* | 1/2015 | Stephens, Jr. | G10L 15/063 704/260 |
| 2016/0189704 A1* | 6/2016 | Suzuki | G06F 40/295 704/260 |
| 2018/0221769 A1* | 8/2018 | Kosai | H04L 67/125 |
| 2019/0043472 A1* | 2/2019 | Garcia | G10L 21/003 |
| 2019/0043474 A1* | 2/2019 | Kingsbury | G06F 40/117 |
| 2020/0394998 A1* | 12/2020 | Kim | G10L 13/10 |
| 2020/0410241 A1* | 12/2020 | Sundareson | A63F 13/44 |
| 2021/0097976 A1* | 4/2021 | Chicote | G10L 13/10 |
| 2021/0233534 A1* | 7/2021 | Nadig | G06F 40/284 |
| 2022/0051654 A1* | 2/2022 | Finkelstein | G06N 3/088 |
| 2023/0075891 A1* | 3/2023 | Zheng | G10L 19/04 |

OTHER PUBLICATIONS

Jia, Ye, et al. "Transfer Learning from Speaker Verification to Multispeaker Text-To-Speech Synthesis." arXiv preprint arXiv:1806.04558 (2018), Retrieved from https://arxiv.org/abs/1806.04558.

Polyak, Adam, et al. "TTS skins: Speaker conversion via ASR." arXiv preprint arXiv:1904.08983 (2019), Retrieved from https://arxiv.org/abs/1904.08983.

Sun, Lifa, et al. "Voice conversion using deep bidirectional long short-term memory based recurrent neural networks." 2015 IEEE international conference on acoustics, speech and signal processing (ICASSP). IEEE, 2015., Retrieved from: https://www.researchgate.net/profile/Lifa_Sun/publication/280919021_Voice_Conversion_Using_Deep_Bidirectional_Long_Short-Term_Memory_based_Recurrent_Neural_Networks/links/55cb072808aeca747d69fd26.pdf.

Kameoka, Hirokazu, et al. "StarGAN-VC: Non-parallel many-to-many voice conversion with star generative adversarial networks." arXiv preprint arXiv:1806.02169 (2018), Retrieved from https://arxiv.org/abs/1806.02169.

Liu, Li-Juan, et al. "WaveNet Vocoder with Limited Training Data for Voice Conversion." Interspeech. 2018, Retrieved from https://www.isca-speech.org/archive/Interspeech_2018/pdfs/1190.pdf.

Narayanan, Praveen, et al. "Hierarchical sequence to sequence voice conversion with limited data." arXiv preprint arXiv:1907.07769 (2019), Retrieved from https://arxiv.org/abs/1907.07769.

Zhang, Mingyang, et al. "Joint training framework for text-to-speech and voice conversion using multi-source tacotron and wavenet." arXiv preprint arXiv:1903.12389 (2019), Retrieved from https://arxiv.org/abs/1903.12389.

Huang, Wen-Chin, et al. "Voice transformer network: Sequence-to-sequence voice conversion using transformer with text-to-speech pretraining." arXiv preprint arXiv:1912.06813 (2019), Retrieved from https://arxiv.org/abs/1912.06813.

Luong, Hieu-Thi, and Junichi Yamagishi. "Bootstrapping non-parallel voice conversion from speaker-adaptive text-to-speech." arXiv preprint arXiv:1909.06532 (2019), Retrieved from https://arxiv.org/abs/1909.06532.

Kim, Tae-Ho, et al. "Emotional Voice Conversion using multitask learning with Text-to-speech." arXiv preprint arXiv:1911.06149 (2019), Retrieved from: https://arxiv.org/abs/1911.06149.

Ren, Yi, et al. "FastSpeech 2: Fast and High-Quality End-to-End Text-to-Speech." arXiv preprint arXiv:2006.04558 (2020), Retrieved from: https://arxiv.org/abs/2006.04558.

Skerry-Ryan, R. J., et al. "Towards end-to-end prosody transfer for expressive speech synthesis with tacotron." arXiv preprint arXiv:1803.09047 (2018), Retrieved from: https://arxiv.org/abs/1803.09047.

Theune, Mariët, et al. "Generating expressive speech for storytelling applications." IEEE Transactions on Audio, Speech, and Language Processing 14.4 (2006): 1137-1144., Retrieved from: https://ieeexplore.IEEE.org/abstract/document/1643643.

Gibiansky, Andrew, et al. "Deep voice 2: Multi-speaker neural text-to-speech." Advances in neural information processing systems. 2017, Retrieved from: http://papers.nips.cc/paper/6889-deep-voice-2-multi-speaker-neural-text-to-speech.

Shen, Jonathan, et al. "Natural tts synthesis by conditioning wavenet on mel spectrogram predictions." 2018 IEEE International Conference on Acoustics, Speech and Signal Processing (ICASSP). IEEE, 2018, Retrieved from: https://ieeexplore.ieee.org/abstract/document/8461368.

Wu, Xixin, et al. "Rapid Style Adaptation Using Residual Error Embedding for Expressive Speech Synthesis." Interspeech. 2018, Retrieved from: http://www1.se.cuhk.edu.hk/~hccl/publications/pub/2018_201809_INTERSPEECH_XixinWU.pdf.

Zen, Heiga, et al. "The HMM-based speech synthesis system (HTS) version 2.0." SSW. 2007, Retrieved from: http://citeseerx.ist.psu.edu/viewdoc/download?doi=10.1.1.69.5302&rep=rep1&type=pdf.

Kalchbrenner, Nal, et al. "Efficient Neural Audio Synthesis." International Conference on Machine Learning. 2018, Retrieved from: http://proceedings.mlr.press/v80/kalchbrenner18a.html.

Eyben, Florian, et al. "Unsupervised clustering of emotion and voice styles for expressive TTS." 2012 IEEE International Conference on Acoustics, Speech and Signal Processing (ICASSP). IEEE, 2012, Retrieved from: https://ieeexplore.ieee.org/abstract/document/6288797.

Wang, Yuxuan, et al. "Tacotron: Towards end-to-end speech synthesis." arXiv preprint arXiv:1703.10135 (2017), Retrieved from: https://arxiv.org/abs/1703.10135.

Wang, Yuxuan, et al. "Style Tokens: Unsupervised Style Modeling, Control and Transfer in End-to-End Speech Synthesis." ICML. 2018, Retrieved from: https://openreview.net/forum?id=Hy4s90-OZr.

Akuzawa, Kei, Yusuke Iwasawa, and Yutaka Matsuo. "Expressive Speech Synthesis via Modeling Expressions with Variational Autoencoder." Proc. Interspeech 2018 (2018): 3067-3071, Retrieved from: https://www.isca-speech.org/archive/Interspeech_2018/abstracts/1113.html.

Taigman, Yaniv, et al. "VoiceLoop: Voice Fitting and Synthesis via a Phonological Loop." International Conference on Learning Representations. 2018, Retrieved from: https://openreview.net/forum?id=SkFAWax0-&noteId=SkFAWax0-.

Hsu, Wei-Ning, et al. "Hierarchical Generative Modeling for Controllable Speech Synthesis." International Conference on Learning Representations. 2018, Retrieved from: https://openreview.net/forum?id=rygkk305YQ.

Kenter, Tom, et al. "CHiVE: Varying prosody in speech synthesis with a linguistically driven dynamic hierarchical conditional variational network." International Conference on Machine Learning. 2019, Retrieved from: http://proceedings.mlr.press/v97/kenter19a.html.

Lee, Younggun, and Taesu Kim. "Robust and fine-grained prosody control of end-to-end speech synthesis." ICASSP 2019-2019 IEEE International Conference on Acoustics, Speech and Signal Processing (ICASSP). IEEE, 2019, Retrieved from: https://ieeexplore.ieee.org/abstract/document/8683501.

Klimkov, Viacheslav, et al. "Fine-Grained Robust Prosody Transfer for Single-Speaker Neural Text-To-Speech." Proc. Interspeech 2019 (2019): 4440-4444, Retrieved from: https://www.isca-speech.org/archive/Interspeech_2019/abstracts/2571.html.

Daniel, Povey, et al. "The Kaldi speech recognition toolkit." IEEE 2011 workshop on automatic speech recognition and understanding. No. EPFL-CONF-192584. 2011, Retrieved from: https://www.fit.vut.cz/research/product/304/.

(56) References Cited

OTHER PUBLICATIONS

Ghahremani, Pegah, et al. "A pitch extraction algorithm tuned for automatic speech recognition." 2014 IEEE international conference on acoustics, speech and signal processing (ICASSP). IEEE, 2014, Retrieved from: https://ieeexplore.ieee.org/abstract/document/6854049.

* cited by examiner ized speech audio for an announcer declaring that a goal has been scored. There may be multiple contexts in the video game for which the speech content (e.g. "Goal!") of pre-recorded speech audio is suitable, however the prosody (e.g. performance aspects such as intensity/arousal, valence, pitch) of the recording may not be suitable for all of these contexts (e.g. depending on if the team scoring the goal is losing or winning). Additional speech audio for these contexts may be recorded, however storing these additional recordings for use by the video game requires more storage space.

SPEECH PROSODY PREDICTION IN VIDEO GAMES

BACKGROUND

In many video games, speech audio is pre-recorded and output at an appropriate time in the video game. For example, when a goal has been scored in a sports video game, the video game may output pre-recorded speech audio for an announcer declaring that a goal has been scored. There may be multiple contexts in the video game for which the speech content (e.g. "Goal!") of pre-recorded speech audio is suitable, however the prosody (e.g. performance aspects such as intensity/arousal, valence, pitch) of the recording may not be suitable for all of these contexts (e.g. depending on if the team scoring the goal is losing or winning). Additional speech audio for these contexts may be recorded, however storing these additional recordings for use by the video game requires more storage space.

SUMMARY

In accordance with a first aspect, this specification describes a computer-implemented method of generating context-dependent speech audio in a video game. The method comprises obtaining contextual information relating to a state of the video game. The contextual information is inputted into a prosody prediction module. The prosody prediction module comprises a trained machine learning model which is configured to generate predicted prosodic features based on the contextual information. Input data comprising the predicted prosodic features and speech content data associated with the state of the video game is inputted into a speech audio generation module. An encoded representation of the speech content data dependent on the predicted prosodic features is generated using one or more encoders of the speech audio generation module. Context-dependent speech audio is generated, based on the encoded representation, using a decoder of the speech audio generation module.

In accordance with a second aspect, this specification describes a computer-implemented method of training a prosody prediction model for use in generating context-dependent speech audio in a video game. The method comprises: receiving one or more training examples. Each training example comprises: (i) contextual information for a state of the video game, and (ii) ground-truth speech audio that is associated with the state. For each training example of the one or more training examples, the contextual information is inputted into the prosody prediction model. Predicted prosodic features are generated as output of the prosody prediction model. Parameters of the prosody prediction model are updated based on an objective function. The objective function is dependent on the predicted prosodic features and the ground-truth speech audio of each training example.

In accordance with a third aspect, this specification describes a non-transitory computer-readable medium containing instructions, which when executed by a processor, cause the processor to perform a method comprising: obtaining contextual information relating to a state of the video game; inputting, into a prosody prediction module, the contextual information; inputting, into a speech audio generation module, input data comprising the predicted prosodic features and speech content data associated with the state of the video game; and generating context-dependent speech audio as an output of the speech audio generation module.

DETAILED DESCRIPTION

General Definitions

Figure 1:
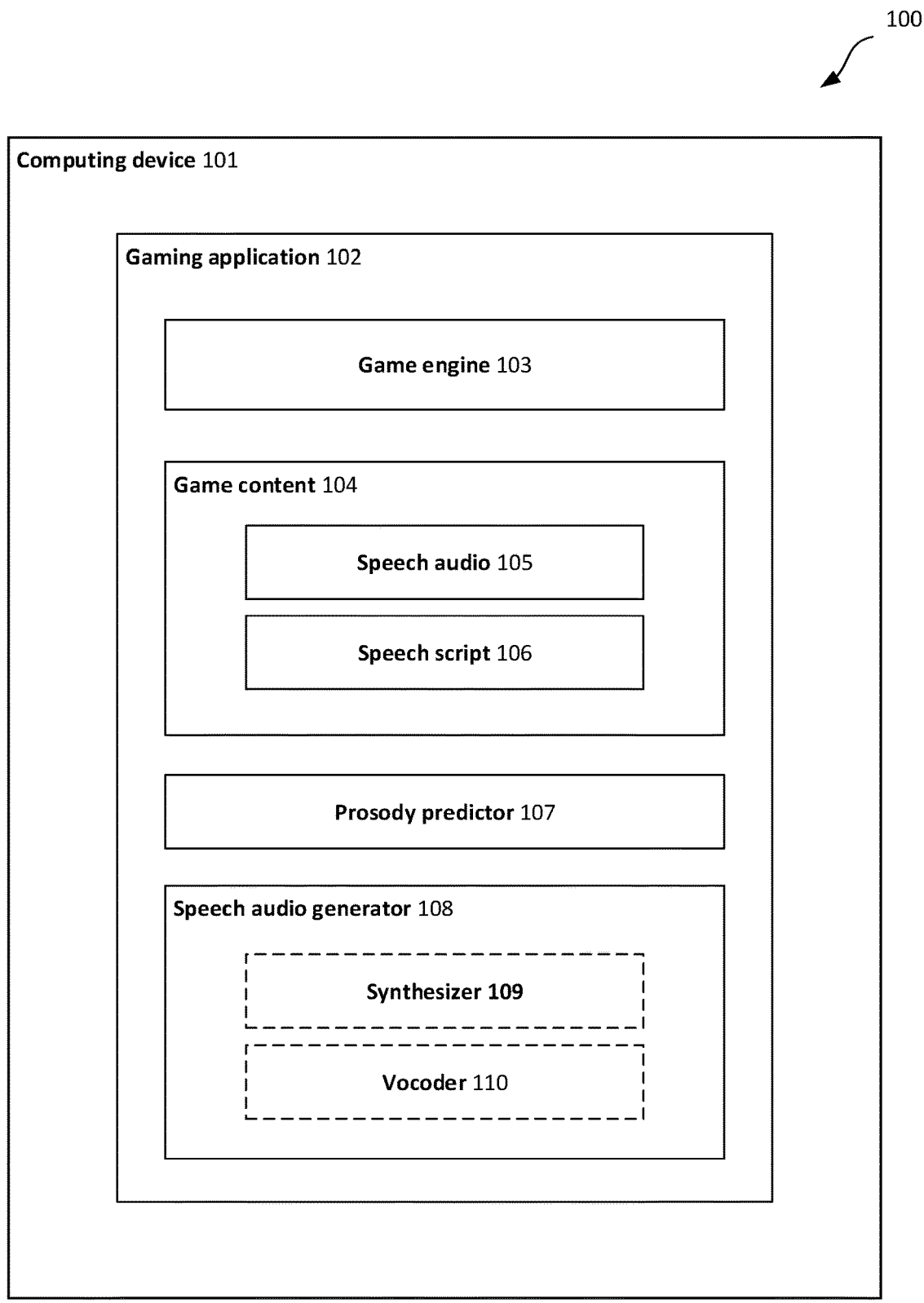
FIG. 1 is a schematic block diagram illustrating an example of a computer system configured to provide a video game environment to players of a video game.

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "client", as used in some embodiments described herein, is a software application with which a user interacts, and which can be executed on a computing system or device locally, remotely, or over a cloud service.

A "server" as used in some embodiments described here, is a software application configured to provide certain services to a client, e.g. content and/or functionality.

A "video game" as used in some embodiments described herein, is a virtual interactive environment in which players engage. Video game environments may be facilitated through a client-server framework in which a client may connect with the server to access at least some of the content and functionality of the video game.

"Speech" as used in some embodiments described herein may include sounds in the form of spoken words in any language, whether real or invented and/or other utterances including paralinguistics such as sighs, yawns, moans etc. "Speech audio" refers to audio (e.g. audio data) which includes or represents speech, and may comprise data in any suitable audio file format whether in a compressed or uncompressed format.

"Text" as used in some in embodiments described herein refers to any suitable representation of characters, words or symbols that may be used to represent language and/or speech. In some cases text may be input by use of a keyboard and/or stored in memory in the form of text data. Text may comprise text data in any suitable compressed or uncompressed format, e.g. ASCII format.

"Prosody" as used in some embodiments described herein refers to the way in which speech is expressed, e.g. the intonation, pitch, volume, timing (e.g. rhythm, speech rate) and/or tone of speech. It may include pronunciation aspects such as articulation or stress and/or performance aspects such as intensity/arousal or valence. In some embodiments described herein prosody may be represented by prosodic features which may be derived from pitch and/or volume contours, timing information, etc. and may be predicted using the models described herein.

A "speech audio generator" as used in some embodiments described herein, is a software module that receives an indication of an utterance (e.g. speech content data) and outputs speech audio corresponding to the indication. Various characteristics of the output speech audio may be varied by speech audio generator modules described herein, e.g. speech content, speaker identity, and speech style (for example the prosody of the output speech).

"Acoustic features" as used in some embodiments described herein may include any suitable acoustic representation of frequency, magnitude and/or phase information. For example, acoustic features may comprise linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof.

Example implementations provide systems and methods for predicting speech prosody for use in generating speech audio in a video game. The video game continually (e.g. periodically) determines contextual information relating to the state of the video game, which is input to a prosody prediction module (otherwise referred to herein as a prosody predictor) when generating speech audio. The prosody prediction module is configured to predict prosodic features given a particular context of the video game. The predicted prosodic features and speech content data associated with the state of the video game are inputted into a speech audio generation module and speech audio for the speech content represented in the speech content data is generated, in accordance with the predicted prosodic features.

In this way, systems and methods described in this specification enable expressive speech audio to be dynamically generated such that the performance of the generated speech audio matches the current context/states of the video game. This is particularly advantageous in video games where it is difficult, during the development phase of the video game, to anticipate and specifically plan for all of the potential contexts/states that may occur when the game is actually played. For example, some modern video games are unpredictable as they may involve procedural generation and/or include storylines that evolve as a result of player choices. In these (and other) video games, pre-recording speech audio that is appropriate for the potential contexts is a difficult task.

Systems and methods described in this specification may be used for real-time generation of speech audio (or faster than real-time), such that the context of the video game used to predict prosodic features is still relevant when the generated speech audio is output to a player of the video game. In this way, the performance of the generated speech audio may be responsive to real-time game events. The prosody predictor and speech audio generator may be provided on the same computing device as the video game is provided on, reducing latency when compared to other approaches of generating speech audio using models that are hosted externally on one or more separate computing devices. The speech audio generator may comprise neural networks such as transformer networks, flow-based networks or another suitable architecture which may be used to output speech audio in real-time.

Furthermore, systems and methods described herein may allow for fine-grained control of the prosody of generated speech audio. For example, the prosody predictor may be configured to output prosodic features (which are also referred to herein as prosody embeddings) for each time step of a plurality of time steps. The plurality of time steps may correspond to time steps of the speech content data, with each time step being associated with a unit of the speech content data (e.g. characters, phonemes, words). The prosodic features predicted for each time step may be used, along with the speech content data, by the speech audio generator to generate realistic and expressive speech audio for the speech content represented in the speech content data. Other characteristics of the generated speech audio, such as the speaker identity, may also be easily controlled by the methods and systems described herein.

Video games that use the methods and systems described herein may require less storage space than video games which do not. For example, the prosody predictor and speech audio generator described herein may be used instead of storing all of the pre-recorded speech audio that may be used for the many contexts/scenarios of modern video games.

Example Video Game Environment

FIG. 1 illustrates an example of a computer system configured to provide a video game environment 100 to players of a video game. The video game environment 100 is configured to provide expressive speech audio that is dynamically generated such that the performance of the generated speech audio matches the current context/environment of the video game. A prosody predictor 107 is configured to predict prosodic features given a particular (e.g. current) context of the video game. The predicted prosodic features and speech content data are inputted into a speech audio generator 108 and speech audio for the speech content represented in the speech content data is generated, in accordance with the predicted prosodic features.

The video game environment 100 includes one or more client computing devices 101. Each client computing device 101 is operable by a user and provides a client in the form of gaming application 102 to the user. The client computing device 101 may be configured to communicate with a video game server apparatus including a game server for providing content and functionality to the gaming application 102. For the sake of clarity, the video game environment 100 is illustrated as comprising a specific number of devices. Any of the functionality described as being performed by a specific device may instead be performed across a number of computing devices, and/or functionality described as being performed by multiple devices may be performed on a single device.

The client computing device 101 can be any computing device suitable for providing the gaming application 102 to the user. For example, the client computing device 101 may be any of a laptop computer, a desktop computer, a tablet computer, a video games console, or a smartphone. For displaying the graphical user interfaces of computer programs to the user, the client computing device includes or is connected to a display (not shown). Input device(s) (not shown) are also included or connected to the client. Examples of suitable input devices include keyboards, touchscreens, mice, video game controllers, microphones and cameras.

Gaming application 102 provides a video game to the user of the client computing device 101. The gaming application 102 may be configured to cause the client computing device 101 to request video game content from a video game server apparatus while the user is playing the video game. Requests made by the gaming application 102 may be received at a request router of a game server, which processes the request, and returns a corresponding response to gaming application 102. Examples of requests include Application Programming Interface (API) requests, e.g. a representational state transfer (REST) call, a Simple Object Access Protocol (SOAP) call, a message queue; or any other suitable request.

Gaming application 102 includes a game engine 103. The game engine 103 can be configured to execute aspects of the operation of the gaming application 102 according to game rules. Examples of game rules can include rules for scoring, possible inputs, actions/events, movement in response to inputs, and the like. The game engine 103 may receive user inputs and determine in-game events, such as actions, jumps, runs, throws, attacks, and other events appropriate for the gaming application 102. During runtime operation, the game engine 103 can read user inputs, in-game data, and game state information to determine the appropriate in-game events. Furthermore, the game engine 103 is configured to determine the state of the video game as it is being played. This involves determining and storing contextual information which is based on the current state of the video game. For example, in a sports video game, the contextual information may include: statistics relating to one or more teams playing in a match; statistics relating to one or more players playing in the match; statistics relating to the current status of the match; and/or the type of sport being played in the match. Contextual information (or a portion thereof) determined by game engine 103 is used when predicting speech prosody for a particular (e.g. current) context of the video game.

The game engine 103 may request generated speech audio to be provided from speech audio generator 108 at particular moments while the video game is being played. For example, the game engine 103 may determine whether one or more criteria for the context of the video game are satisfied, and cause the speech audio generator 108 to provide speech audio in response to determining that the one or more criteria are satisfied. As an example, in a sports video game, the game engine 103 may request generated speech audio after certain actions have occurred such as a goal being scored, or a particular player making a pass, etc. As another example, in an action-adventure game, the game engine 103 may request generated speech audio when a character controlled by the player reaches a certain destination in the virtual world of the action-adventure game. In some cases, the game engine 103 may determine in advance that a particular context of the video game will be reached. In these cases, the game engine 103 may cause the prosody predictor 107 to output prosodic features for the particular context. Subsequently, the prosodic features may be stored and/or used immediately for input to speech audio generator 108.

The gaming application 102 comprises game content 104 accessed while the video game is being played by the player. The game content 104 includes speech audio 105, and speech script 106, and other assets such as markup-language files, scripts, images and music. The speech audio 105 comprises audio data for entities/characters in the video game, which may be output by the gaming application 102 at appropriate stages of the video game. The speech audio 105 (or a portion thereof) has corresponding speech scripts 106 which are transcriptions of the speech audio 105. Additionally or alternatively, the speech scripts 106 may comprise indications of utterances that do not have corresponding speech audio stored as part of game content 104.

The gaming application includes a prosody predictor 107, and a speech audio generator 108. As will be described in further detail in relation to FIG. 2, as the video game is being played, the prosody predictor 107 receives contextual information that is based on the current context of the video game and outputs predicted prosodic features for the current context of the video game. The prosody predictor 107 may comprise a neural network that has been trained to predict prosodic features, based on contextual information, for use in generating speech audio.

The speech audio generator 108 receives the predicted prosodic features, speech content data representing speech content for the speech audio that is to be generated, and optionally, speaker identifier data, and outputs generated speech audio in accordance with these received inputs. The generated speech audio comprises a waveform of speech audio. As will be described in further detail in relation to FIG. 3, the speech audio generator 108 may comprise a synthesizer 109 and a vocoder 110. In these implementations, the synthesizer 109 may be configured to output acoustic features for speech audio, with the vocoder 110 transforming the acoustic features into generated speech audio. Alternatively, a synthesizer and a vocoder may be combined as a single model to form the speech audio generator 108. The speech audio generator 108 may comprise one or more trained neural networks.

In general, trained neural networks comprise parameters that have been learned after training the neural networks on one or more tasks using training data. Example methods of training the models disclosed above are described in relation to FIGS. 4, 5, and 6.

As depicted in FIG. 1, the prosody predictor 107 and speech audio generator 108 are shown as components that are local to computing device 101. This may be advantageous for reducing latency, as speech audio that is generated as the video game is being played may not need to be transmitted to computing device 101 over a network. However, it will be appreciated that other implementations are possible, such as the prosody predictor 107 and/or speech audio generator 108 (or components thereof) being implemented on a separate computing device (e.g. a video game server) to computing device 101.

Methods and systems described herein may be used for any suitable video game. For example, the video game may be a sports video game and speech audio may be generated for an announcer in the sports video game. As another example, the video game may be an action-adventure video game, and speech audio may be generated for one or more background characters (e.g. non-playing characters).

Example Speech Audio Generator Method

Figure 2:
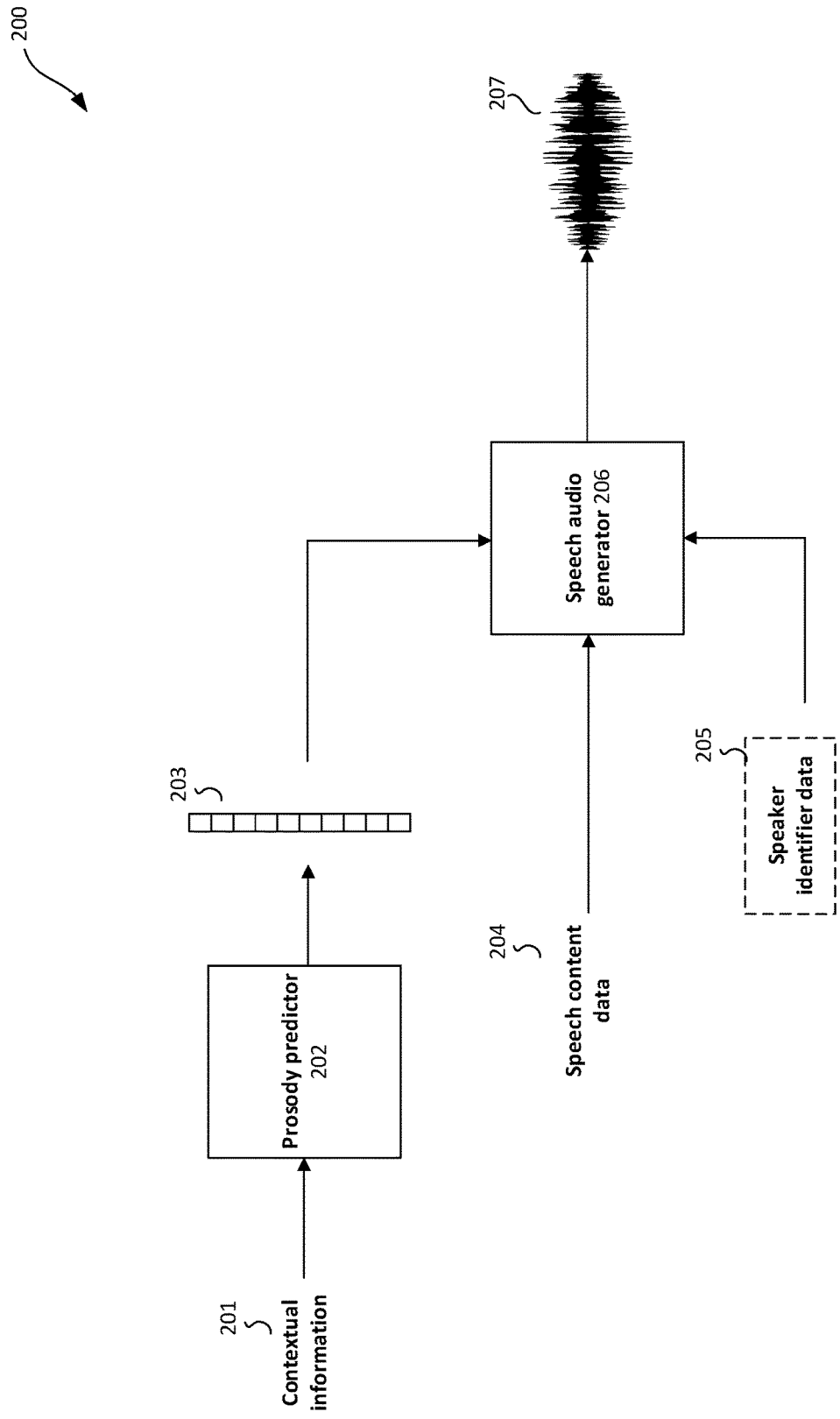
FIG. 2 illustrates an example method for generating speech audio in a video game using prosodic features predicted from contextual information that is based on a current context of the video game.

FIG. 2 illustrates an example method 200 for generating speech audio 207 in a video game using prosodic features predicted from contextual information 201 that is based on a current context of the video game. The method 200 is performed as the video game is being played.

Contextual information 201 is data relating to the state of the video game. For example, in a sports video game, contextual information relating to a state of the video game may comprise determining at least one of: statistics relating to one or more teams playing in a match; statistics relating to one or more players playing in the match; statistics relating to the current status of the match; or the type of sport being played in the match. The contextual information 201 may comprise any combination of binary features, discrete/categorical features, and numerical features relating to a state of the video game. The contextual information 201 for a particular context of the video game may be represented as a vector, with binary and discrete/categorical features appropriately coded in the vector (e.g. using one hot encodings of discrete/categorical features).

The contextual information 201 may further comprise speech content data, and/or speaker identifier data. The speech content data represents desired speech content for the speech audio 207 that is to be generated, and the speaker identifier data represents the desired speaker of the speech audio 207. Speech content data may be encoded into a fixed-dimension sentence embedding (e.g. by using pre-trained models which infer sentence embedding), or an average embedding may be used. The speaker identifier data may comprise a one-hot vector representing a particular speaker. Alternatively, the speaker identifier data may comprise a speaker embedding for a particular speaker. A speaker embedding is an embedding of a learned latent space such that speakers with similar voices are represented by similar speaker embeddings in the learned latent space. This embedding can be obtained from a pre-trained model that has been trained on a task such as speaker verification. It may be beneficial to include speaker identifier data in contextual information 201 (which is input to prosody predictor 202) as prosodic features such as pitch and energy may vary between different speakers.

As described previously in relation to FIG. 1, it may be determined in advance that a particular context of the video game will be reached. In these cases, contextual information 201 may be based on the particular context.

Prosody predictor 202 receives contextual information 201 and outputs predicted prosodic features 203 based on the contextual information 201. The prosody predictor 202 may output a single prosody vector (or embedding) representing global prosodic features for the entirety of generated speech audio 207. Alternatively, the prosody predictor 202 may output a prosody vector for each time step of one or more time steps. The time steps may correspond to time steps of speech content data 204, and each prosody vector may represent fine-grained prosodic features for the respective time step.

The prosody predictor 202 may comprise a neural network that has been trained to predict prosodic features, based on contextual information, for use in generating speech audio. In some implementations, and as will be discussed in relation to FIG. 4, the prosody predictor 202 may have been trained separately to speech audio generator 206. In these implementations, the prosody predictor 202 may comprise one or more fully-connected layers and the prosody predictor 202 may be configured to output global prosodic features based on contextual information 201. In other implementations, and as will be discussed in relation to FIG. 6, the prosody predictor 202 may have been trained jointly with speech audio generator 206. In these implementations, the prosody predictor 202 may comprise one or more recurrent neural network layers (e.g. LSTM layers) and the prosody predictor 202 may be configured to output fine-grained prosodic features.

In a neural network comprising one or more fully-connected layers, each fully connected layer receives an input and applies a learned linear transformation to its input. The fully connected layer may further apply a non-linear transformation to generate an output for the layer.

In a neural network comprising one or more recurrent layers, each recurrent layer comprises a hidden state that is updated as the recurrent neural network processes data input to the network. For each time step, recurrent layer receives its hidden state from the previous time step, and an input to the recurrent layer for the current time step. A recurrent layer processes its previous hidden state and the current input in accordance with its parameters and generates an updated hidden state for the current time step. For example, recurrent layer may apply a first linear transformation to the previous hidden state and a second linear transformation to the current input and combine the results of the two linear transformations e.g. by adding the two results together. The recurrent layer may apply a non-linear activation function (e.g. a tanh activation function, a sigmoid activation function, a ReLU activation function, etc.) to generate an updated hidden state for the current time step.

The speech content data 204 represents desired speech content for the speech audio 207 that is to be generated. The speech content data 204 may comprise text data. The text data may be any digital data representing text. Additionally or alternatively, the data representing speech content may comprise one or more indications of paralinguistic information. Any paralinguistic utterance may be indicated in the speech content, such as sighs, yawns, moans, laughs, grunts, etc. The speech content may be encoded by a sequence of vectors with each vector representing a character of the speech content. For example, a character may be a letter, a number, and/or a tag indicating a paralinguistic utterance. The elements of a character vector may correspond with one character out of a set of possible characters, with each character represented by a character vector with only one non-zero element (also known as a one-hot vector). Additionally or alternatively, the speech content may be represented by continuous embeddings, e.g. character embeddings and/or word embeddings. Generally, embeddings are vectors of a learned embedding space. The speech content data 204 may comprise phoneme information.

The speech content data 204 may be determined in any suitable manner. For example, it may be determined from game content (such as in speech script 106 of FIG. 1). As another example, a separate speech content generation system may be used to provide speech content data 204.

The speaker identifier data 205 is any data indicating the desired speaker of the speech audio 207. The speaker identifier data 205 may comprise a one-hot vector representing a particular speaker. Alternatively, the speaker identifier data 205 may comprise a speaker embedding for a particular speaker. A speaker embedding is an embedding of a learned latent space such that speakers with similar voices are represented by similar speaker embeddings in the learned latent space. This embedding can be obtained from a pre-trained model that has been trained on a task such as speaker verification.

Speech audio generator 206 receives the predicted prosodic features 203, speech content data 204, and (optionally) speaker identifier data 205 and outputs generated speech audio 207 in accordance with these received inputs. The generated speech audio 207 comprises a waveform of speech audio.

As will be described in relation to FIG. 3, the speech audio generator 206 may comprise a synthesizer and a vocoder. In these implementations, the synthesizer may be configured to output acoustic features for speech audio, with the vocoder transforming the acoustic features into generated speech audio. Alternatively, a synthesizer and a vocoder may be combined as a single model to form the speech audio generator 206. The speech audio generator 206 may comprise one or more trained neural networks.

The generated speech audio 207 may be post-processed. Post-processing steps may include denoising, upsampling, and/or decompression to a full sample rate.

Example Synthesizer/Vocoder Method

Figure 3:
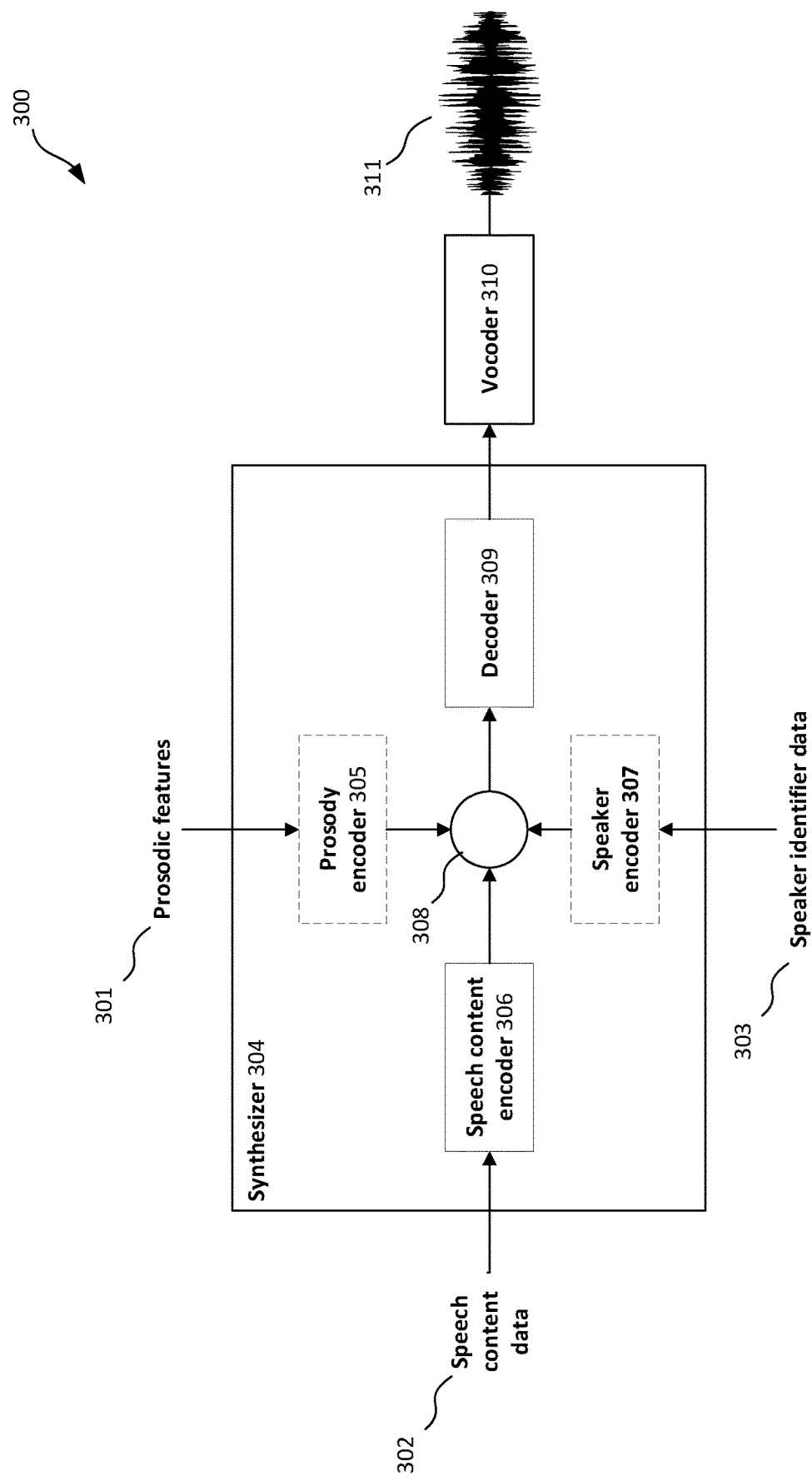
FIG. 3 illustrates an example speech audio generator comprising a synthesizer and a vocoder for use in generating speech audio in a video game.

FIG. 3 illustrates an example speech audio generator 300 comprising a synthesizer 304 and a vocoder 310 for use in generating speech audio 311 in a video game. FIG. 3 shows a more detailed example of the speech audio generators described in relation to FIGS. 1 and 2.

The synthesizer 304 receives prosodic features 301, speech content data 302, and speaker identifier data 303. The prosodic features 301 may be provided from output of a prosody predictor, as described above in relation to FIGS. 1 and 2. The prosodic features may comprise a global prosody vector or a sequence of fine-grained prosody vectors.

The synthesizer 304 comprises a speech content encoder 306 and a decoder 309. The synthesizer 304 may comprise further encoders, such as a speaker encoder 307, and/or a prosody encoder 305. The prosody encoder 305 and/or speaker encoder 307 may be omitted in some implementations, for example in implementations where prosodic features 301 and/or speaker identifier data 303 may be directly combined (e.g. by concatenation, addition, etc.) with speech content encodings generated by speech content encoder 306. For example, speech content encodings may be directly combined with prosody embeddings and/or speaker embeddings.

The speech content data 302 is processed by the speech content encoder 306 to generate one or more speech content encodings. The speech content encoder 306 may output a plurality of speech content encodings, with a speech content encoding output for each time step of the speech content data 302. The speech content encoder 306 may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. The one or more speech content encodings output by the speech content encoder 306 is a learned representation of the speech content data 302, enabling the output of synthesized speech audio 311 corresponding to the speech content data 302.

The prosodic features 301 may be processed by the prosody encoder 305 to generate one or more prosody encodings. The prosody encoder 306 may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

The speaker identifier data 303 may be processed by the speaker encoder 306 to generate a speaker encoding. The speaker encoder 306 may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

The one or more speech content encodings are received at a combining operation 308. The combining operation 308 outputs one or more combined encodings that are derived from the one or more speech content encodings, the prosodic features 301, and the speaker identifier data 303. In implementations where the prosody encoder 305 and the speaker encoder 307 are omitted, the combining operation 308 may be configured to combine the one or more speech content encodings with prosodic features 301 and speaker identifier data 303. In other implementations, the combining operation 308 may combine the one or more speech content encodings with encodings output by prosody encoder 305 and/or speaker encoder 307.

The combining operation 308 may comprise any operation resulting in a single encoding from two or more inputs. For example, the combination may be performed by an addition, an averaging, a concatenation, etc. The prosody encoder 305 and speaker encoder 307 may be configured to produce vector outputs having dimension(s) adapted for combination, during the combining operation 308, with the vector output of the speech content encoder 306. For example in some embodiments the speech content encoder 306, the prosody encoder 305, and speaker encoder 307 may generate vector outputs of the same dimension, which may be combined by a suitable operation such as addition.

The combining operation 308 may output a combined encoding for each time step of one or more time steps. For example, in implementations where speech content encoder 306 outputs a speech content encoding output for each time step of the speech content data 302, the speech content encoding of each time step may be combined with prosodic features 301 (or encodings derived therefrom) and speaker identifier data 303 (or encodings derived therefrom). The prosodic features 301 may comprise a prosody vector for each time step of the one or more time steps. A combined encoding for a time step may be produced by combining the speech content encoding of the time step with the prosody vector of the time step and the speaker identifier data 303 (or an encoding derived therefrom).

The decoder 309 receives the one or more combined encodings and outputs acoustic features for use in generating the speech audio 311. Acoustic features may comprise any low-level acoustic representation of frequency, magnitude and phase information such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The acoustic features may comprise a sequence of vectors, each vector representing acoustic information in a short time period, e.g. 50 milliseconds.

The decoder 309 may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

In some implementations, the decoder 309 comprises an attention mechanism. In these implementations, the combining operation 308 generates a combined encoding for each input time step of the speech content data 302, as described above. For an output time step, the attention mechanism receives the combined encoding of each input time step and generates attention weights for each of the combined encodings. The attention mechanism averages each combined encoding by the respective attention weight to generate a context vector for the output time step. When decoding to produce predicted acoustic features for an output time step, the decoder 309 decodes the context vector for the output time step.

The speech audio generator 300 comprises a vocoder 310. The vocoder 310 is a machine-learned model which is used during processing of the target acoustic features to produce a waveform of speech audio 311. The speech audio is synthesized speech audio in accordance with prosodic features 301, speech content data 302, and speaker identifier data 303.

The training of speech audio generator 300 will be described in relation to FIGS. 5 and 6. In some implementations, the vocoder 310 may be trained separately to the other components of the speech audio generator 300.

For example, the vocoder 310 may be pre-trained using recordings or input from speakers for whom there are many speech samples. In some cases, the same vocoder 310 may be used for many speakers without the need for retraining based on new speakers, i.e. the vocoder 310 may comprise a universal vocoder. For example, the vocoder 310 may be pre-trained using training examples derived from speech samples wherein each training example comprises acoustic features for the speech sample and a corresponding ground-truth waveform of speech audio. The vocoder 310 processes the acoustic features of one or more training examples and generates a predicted waveform of speech audio for the one or more training examples. The vocoder 310 is trained in dependence on an objective function, wherein the objective function comprises a comparison between the predicted waveform of speech audio and the ground-truth waveform of speech audio. The parameters of the vocoder 310 are updated by optimizing the objective function using any suitable optimization procedure. For example, the objective function may be optimized using gradient-based methods such as stochastic gradient descent, mini-batch gradient descent, or batch gradient descent.

Example Prosody Predictor Training Method

Figure 4:
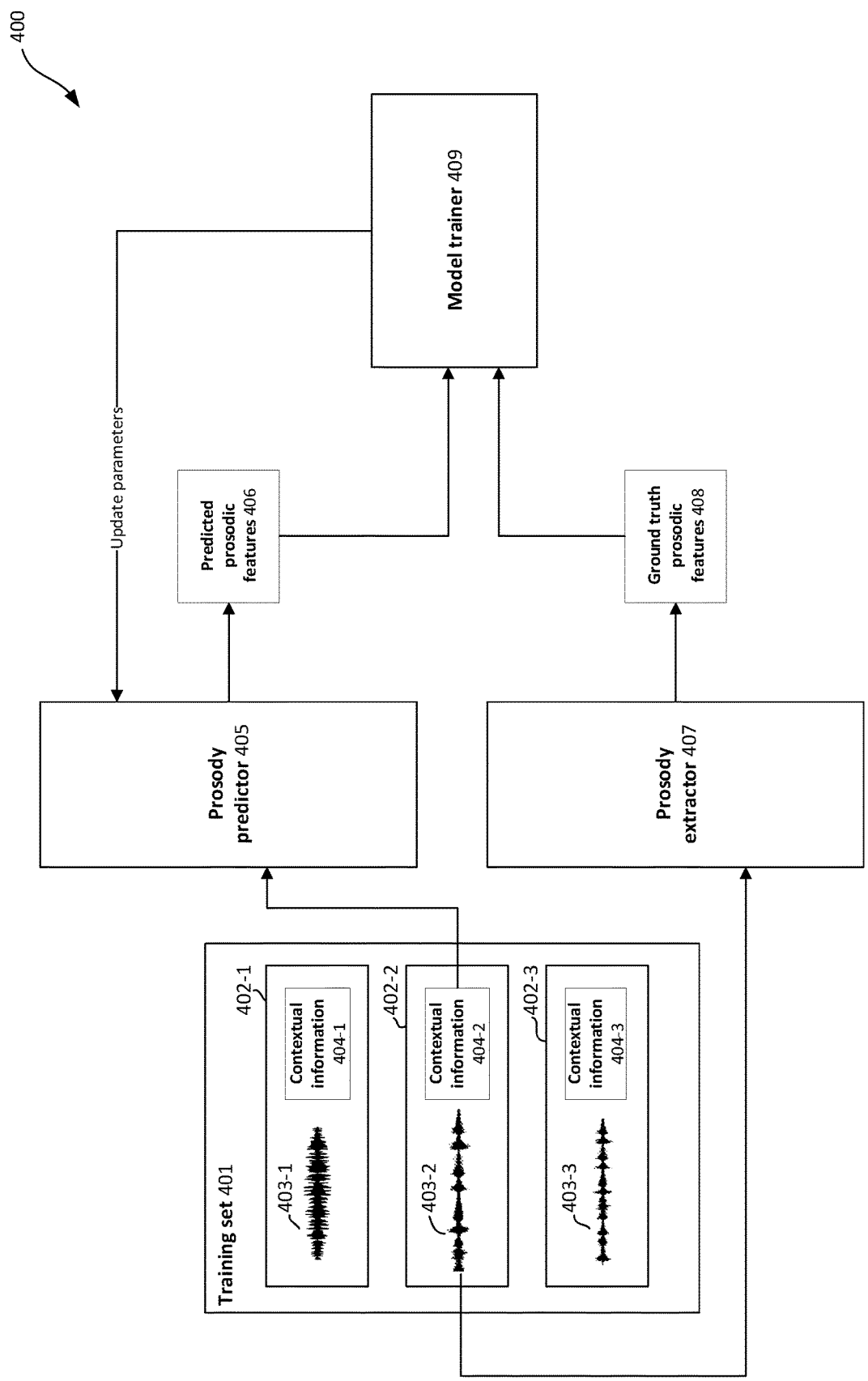
FIG. 4 illustrates an example method for training a prosody predictor to predict prosodic features from contextual information.

FIG. 4 illustrates an example method 400 for training a prosody predictor 405 to predict prosodic features 406 from contextual information 404. In the embodiment depicted in FIG. 4, the prosody predictor 405 is trained separately to the speech audio generator. The separate training of the speech audio generator will be described in relation to FIG. 5.

The prosody predictor 405 is trained using a training set 401 comprising one or more training examples 402. FIG. 4 depicts three training examples 402-1, 402-2, 402-3, however it will be appreciated that the training set 401 can comprise any appropriate number of training examples 402. Each training example 402 comprises speech audio 403-1, 403-2, 403-2 that may be output for a particular context of a video game and respective contextual information 404-1, 404-2, 404-3 relating to the particular context.

During training, the goal for the prosody predictor 405 is to process contextual information 404 for a training example 402 and output predicted prosodic features 406 for the training example that are similar to ground truth prosodic features 408 determined from the speech audio 403 of the training example 402. FIG. 4 depicts this process for training example 402-2.

As shown in FIG. 4, speech audio 403-2 of training example 402-2 is processed by prosody extractor 407 to determine ground truth prosodic features 408 for training example 402-2. The ground truth prosodic features may comprise statistical prosodic features determined from speech audio 403-2. For example, speech audio 403-2 may first be converted into one or more one-dimensional time series data. Statistical prosodic features may be determined from the one or more one-dimensional time series.

The one or more one-dimensional time series data may comprise at least one of a volume contour and a pitch contour. Volume (i.e. loudness) may be represented as the root mean square (RMS) of overlapping frames of audio. For fundamental frequency, a normalized cross-correlation function may be used to compute the pitch contour. The time-series may be a smoothed value of fundamental frequency for each audio frame. Unvoiced frames may be set to 0 in the pitch contour based on a threshold on the RMS. Given log fundamental frequency contours and RMS contours, statistical prosodic features may be computed by extracting "global statistics" (mean, variance, maximum, minimum) over each of the two time-series. The one or more statistical features may comprise: a mean, a variance, a maximum and a minimum of the pitch contour; and a mean, a variance, and a maximum of the volume contour. Additionally or alternatively, the statistical prosodic features may comprise features derived from timing information. For example, statistical prosodic features may be determined from phoneme duration information and/or pause duration information.

The contextual information 404-2 of the training example is received by the prosody predictor 405, which processes the contextual information 404-2 in accordance with a current set of parameters to output predicted prosodic features 406 for the training example.

Model trainer 409 receives the predicted prosodic features 406 and the ground-truth prosodic features 408, and updates parameters of prosody predictor 405 in order to optimize an objective function. The objective function comprises a loss in dependence on the predicted prosodic features 406 and the ground-truth prosodic features 408. For example, the loss may measure a mean-squared error between the predicted prosodic features 406 and the ground-truth prosodic features 408. The objective function may additionally comprise a regularization term, for example the objective function may be a linear combination of the loss and the regularization term. Other weighted losses may be included as part of the objective function.

The parameters of the prosody predictor 405 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

The training process is repeated for a number of training examples, and is terminated at a suitable point in time, e.g. when predicted prosodic features 406 closely match ground-truth target prosodic features 408. Subsequently, the prosody predictor 405 can be used to predict prosodic features for different contexts of the video game (including "unseen" contexts which were not included in the training set) as the video game is being played.

Example Speech Audio Generator Training Method

Figure 5:
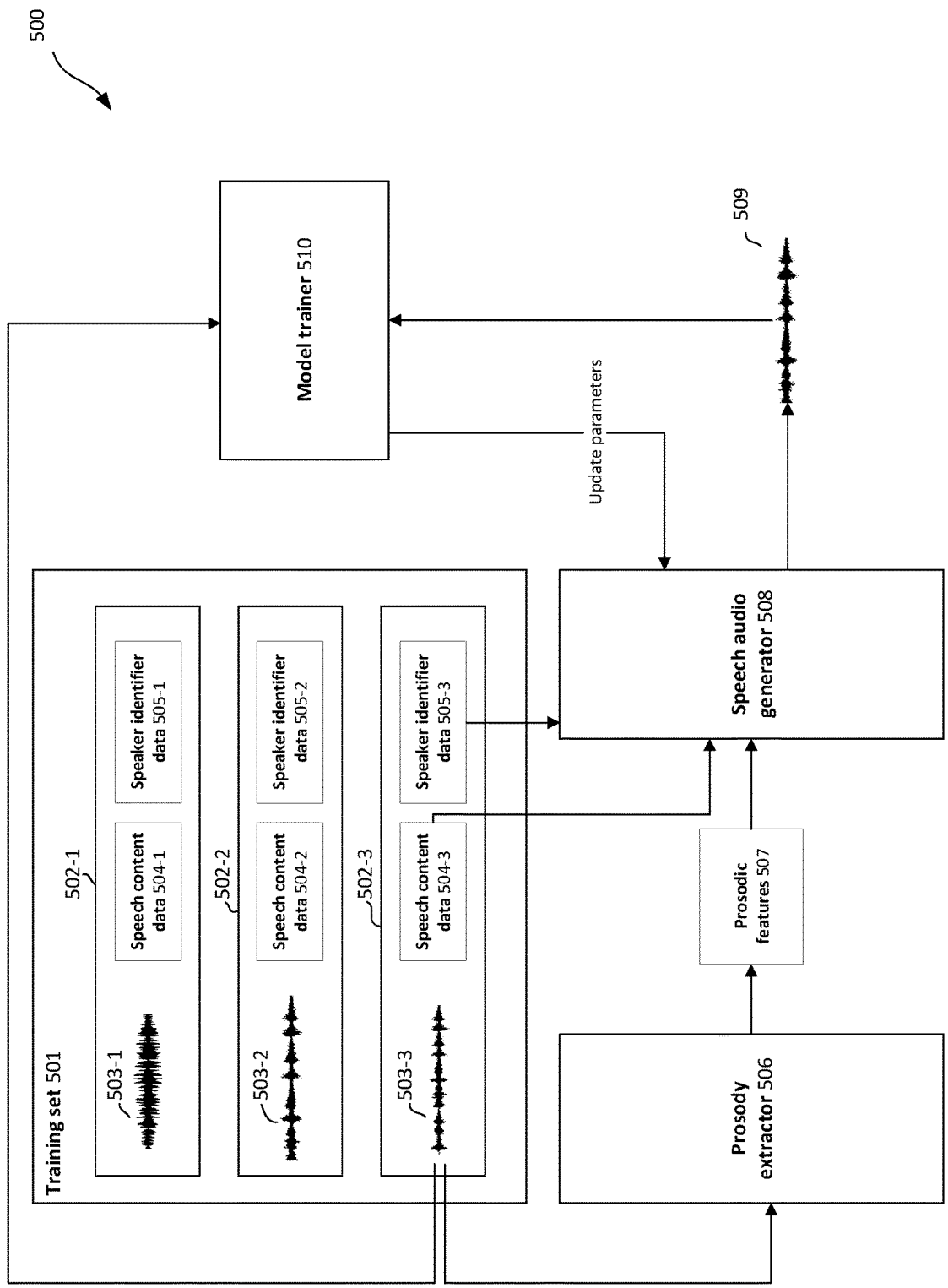
FIG. 5 illustrates an example method for training a speech audio generator to generate speech audio.

FIG. 5 illustrates an example method 500 for training a speech audio generator 508 to generate speech audio 509. In the embodiment depicted in FIG. 5, the speech audio generator 508 is trained separately to the prosody predictor.

The speech audio generator 508 is trained using training set 501 comprising training examples 502. FIG. 5 depicts three training examples 502-1, 502-2, 502-3, however it will be appreciated that the training set 501 can comprise any appropriate number of training examples 502. Each training example 502 comprises "ground-truth" speech audio 503-1, 503-2, 503-2, speech content data 504-1, 504-2, 504-3 representing the speech content of the speech audio, and speaker identifier data 505-1, 505-2, 505-3 indicating the speaker of the speech audio.

During training, the goal for the speech audio generator 508 is to process prosodic features 507, speech content data 504, and speaker identifier data 505 for a training example 502 and output generated speech audio 509 that is similar to ground truth speech audio 503 of the training example 502. FIG. 5 depicts this process for training example 502-3.

As shown in FIG. 5, speech audio 503-3 of training example 502-3 is processed by prosody extractor 506 to determine prosodic features 507 for training example 502-3. The prosodic features may comprise statistical prosodic features determined from speech audio 503-3. For example, speech audio 503-3 may first be converted into one or more one-dimensional time series data. Statistical prosodic features may be determined from the one or more one-dimensional time series.

The one or more one-dimensional time series data may comprise at least one of a volume contour and a pitch contour. Volume (i.e. loudness) may be represented as the root mean square (RMS) of overlapping frames of audio. For fundamental frequency, a normalized cross-correlation function may be used to compute the pitch contour. The time-series may be a smoothed value of fundamental frequency for each audio frame. Unvoiced frames may be set to 0 in the pitch contour based on a threshold on the RMS. Given log fundamental frequency contours and RMS contours, statistical prosodic features may be computed by extracting "global statistics" (mean, variance, maximum, minimum) over each of the two time-series. The one or more statistical features may comprise: a mean, a variance, a maximum and a minimum of the pitch contour; and a mean, a variance, and a maximum of the volume contour. Additionally or alternatively, the statistical prosodic features may comprise features derived from timing information. For example, statistical prosodic features may be determined from phoneme duration information and/or pause duration information.

Prosodic features 507, speech content data 504-3, and speaker identifier data 505-3 for training example 502-3 are received by speech audio generator 508, which processes these received inputs in accordance with a current set of parameters to output generated speech audio 509 for the training example.

Model trainer 510 receives the generated speech audio 509 and the ground-truth speech audio 503-3 for the training example, and updates parameters of speech audio generator 508 in order to optimize an objective function. The objective function comprises a loss in dependence on the generated speech audio 509 and the ground-truth speech audio 503-3. For example, the loss may measure a mean-squared error between the generated speech audio 509 and the ground-truth speech audio 503-3. The objective function may additionally comprise a regularization term, for example the objective function may be a linear combination of the loss and the regularization term. Other weighted losses, e.g. a speaker classifier loss, may be included as part of the objective function.

The parameters of the speech audio generator 508 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

The training process is repeated for a number of training examples, and is terminated at a suitable point in time, e.g. when generated speech audio 509 closely matches ground-truth speech audio 503-3. Subsequently, the speech audio generator 508 can be used to generate realistic expressive speech audio in accordance with received prosodic features, speech content data, and speaker identifier data. When using the speech audio generator 508 at inference time (e.g. when a video game is being played), the prosodic features 507 are determined from output of a prosody predictor, as described previously.

Example Joint Training Method

Figure 6:
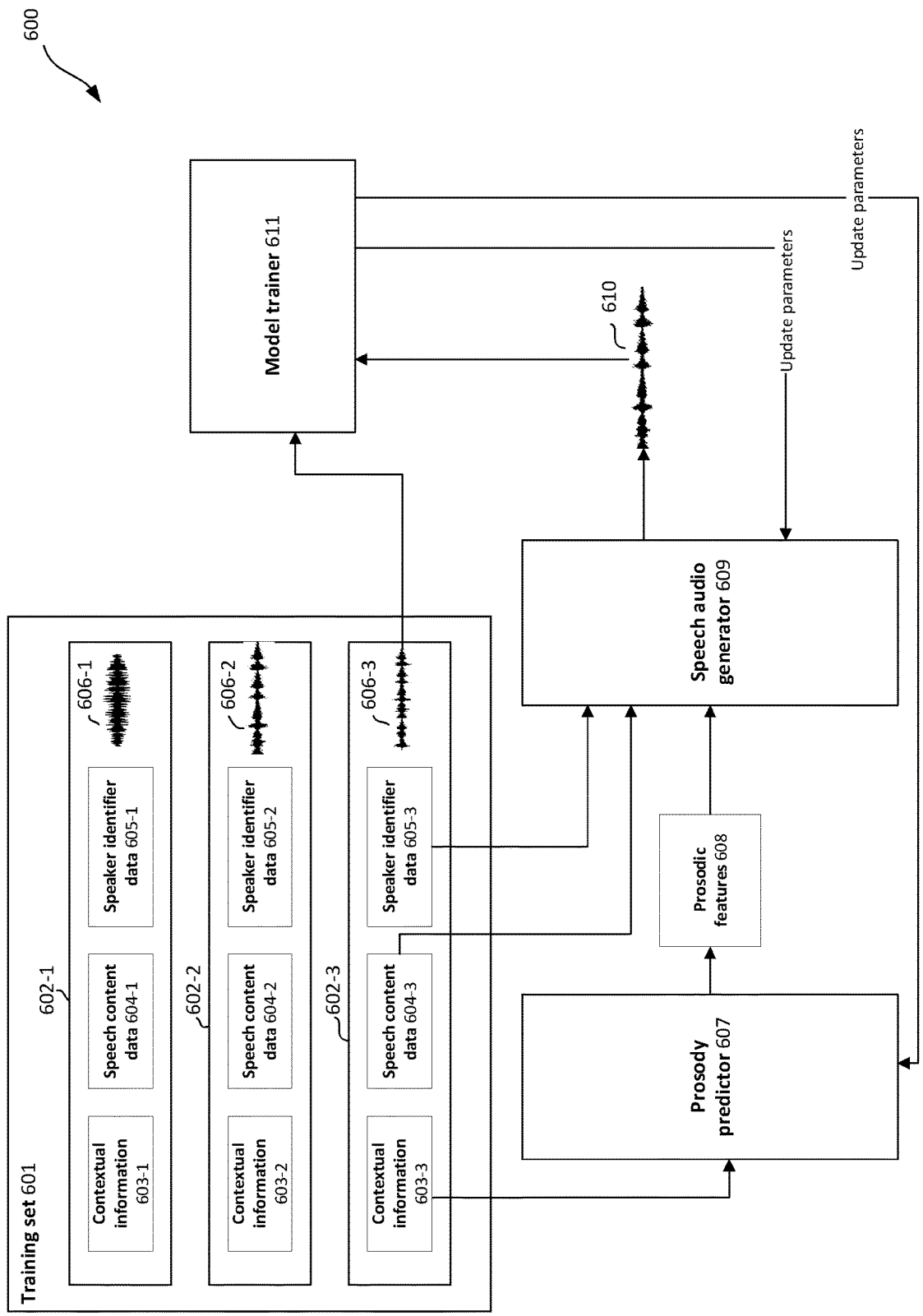
FIG. 6 illustrates an example method for jointly training a prosody predictor and a speech audio generator.

FIG. 6 illustrates an example method 600 for jointly training a prosody predictor 607 and a speech audio generator 609.

The prosody predictor 607 and speech audio generator 609 are jointly trained using training set 601 comprising training examples 602. FIG. 6 depicts three training examples 602-1, 602-2, 602-3, however it will be appreciated that the training set 601 can comprise any appropriate number of training examples 602. Each training example 602 comprises: (i) "ground-truth" speech audio 606-1, 606-2, 606-2 that may be output for a particular context of a video game, (ii) respective contextual information 603-1, 603-2, 603-3 relating to the particular context, (iii) speech content data 604-1, 604-2, 604-3 representing the speech content of the speech audio, and (iv) speaker identifier data 605-1, 605-2, 605-3 indicating the speaker of the speech audio.

During training, the goal for the prosody predictor 607 is to learn a mapping between contextual information 603 and predicted prosodic features 608 such that the performance of speech audio generated in accordance with the predicted prosodic features is suitable for the context of the video game represented by the contextual information 603. The goal for the speech audio generator 609 is to process predicted prosodic features 608, speech content data 604, and speaker identifier data 605 for a training example 502 and output generated speech audio 610 that is similar to ground truth speech audio 606 of the training example 602. FIG. 6 depicts this process for training example 602-3.

The contextual information 603-3 of training example 602-3 is received by the prosody predictor 607, which processes the contextual information 603-3 in accordance with a current set of parameters to output predicted prosodic features 608 for the training example.

The predicted prosodic features 607, speech content data 604-3, and speaker identifier data 605-3 for training example 602-3 are received by speech audio generator 609, which processes these received inputs in accordance with a current set of parameters to output generated speech audio 610 for the training example.

Model trainer 611 receives the generated speech audio 610 and the ground-truth speech audio 606-3 for the training example, and updates parameters of the prosody predictor 607 and the speech audio generator 609 in order to optimize an objective function. The objective function comprises a loss in dependence on the generated speech audio 610 and the ground-truth speech audio 606-3. For example, the loss may measure a mean-squared error between the generated speech audio 610 and the ground-truth speech audio 606-3. The objective function may additionally comprise a regularization term, for example the objective function may be a linear combination of the loss and the regularization term. Other weighted losses, e.g. a speaker classifier loss, may be included as part of the objective function.

The parameters of the prosody predictor 607 and the speech audio generator 609 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

The training process is repeated for a number of training examples, and is terminated at a suitable point in time, e.g. when generated speech audio 610 closely matches ground-truth speech audio 606-3. Subsequently, the prosody predictor 607 can be used to predict prosodic features for different contexts of the video game (including "unseen" contexts which were not included in the training set) as the video game is being played. The speech audio generator 609 can be used to generate realistic expressive speech audio in accordance with prosodic features predicted by the prosody predictor 607, speech content data, and speaker identifier data.

Figure 7:
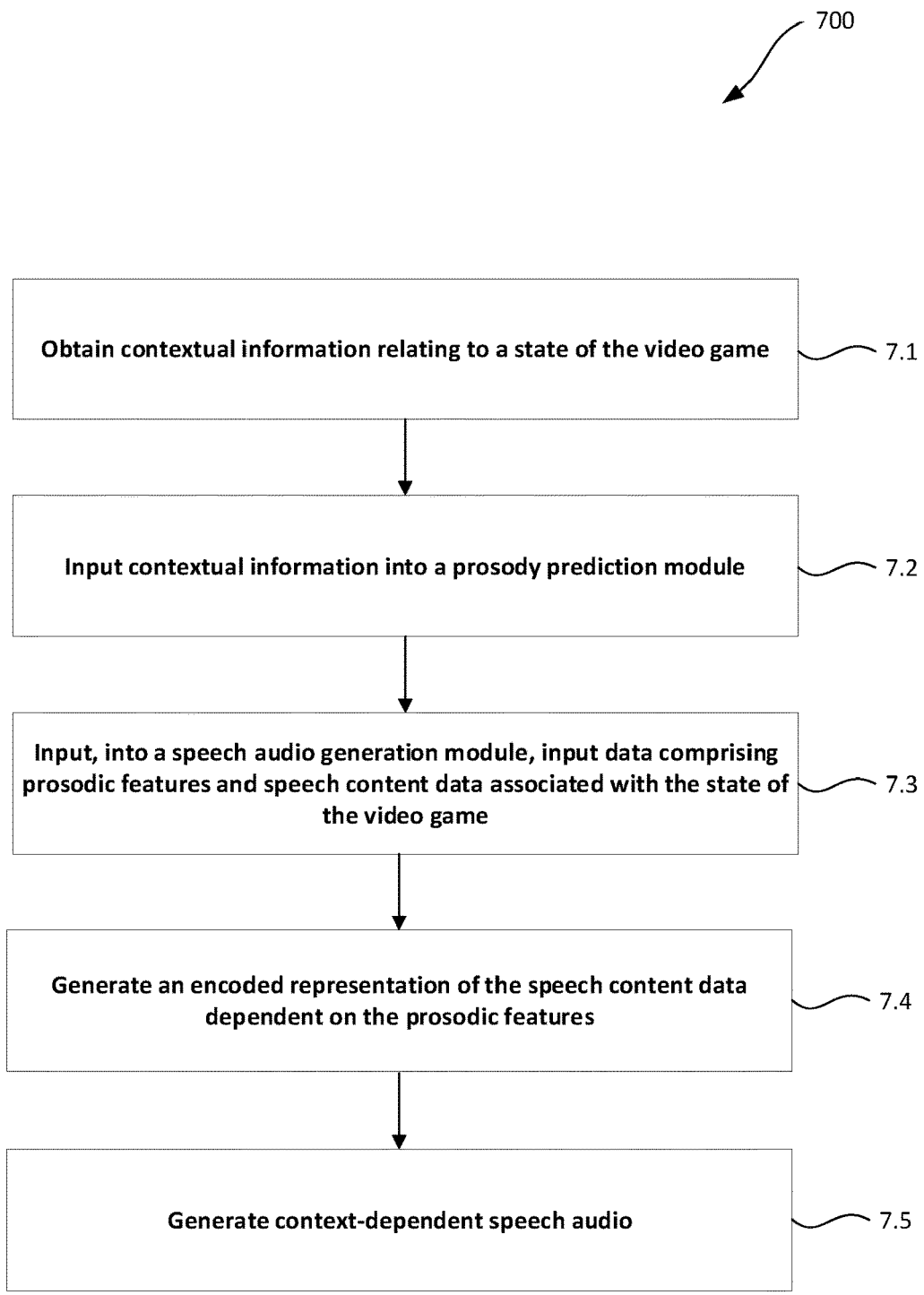
FIG. 7 is a flow diagram illustrating an example method of generating context-dependent speech audio in a video game.

FIG. 7 is a flow diagram illustrating an example method 700 of generating context-dependent speech audio in a video game. FIG. 7 displays a general overview of the methods described in relation to FIGS. 1, 2, and 3.

In step 7.1, contextual information relating to a state of the video game is obtained. The video game may be a sports video game, and the generated speech audio may be for an announcer for the sports video game. Obtaining contextual information relating to the state of the video game may comprise determining contextual information relating to an in-progress match of the sports video game. The contextual information relating of an in-progress match of the sports video game may comprise determining one or more of: statistics relating to one or more teams playing in the match; statistics relating to one or more players playing in the match; statistics relating to the current status of the match; and the type of sport being played in the match.

In step 7.2, the contextual information is inputted into a prosody prediction module. The prosody prediction module comprises a trained machine learning model which is configured to generate predicted prosodic features based on the contextual information. The contextual information may comprise speech content data associated with the state of the video game. The speech content data represents the speech content of the speech audio that is to be generated. The contextual information may comprise speaker identifier data. The speaker identifier data is data that indicates the speaker of the speech audio that is to be generated.

The prosody predictor may comprise a neural network. The neural network may comprise an attention mechanism. The prosody prediction module may comprise a convolutional neural network and/or a generative model such as a variational autoencoders.

In step 7.3, input data comprising the predicted prosodic features and speech content data are inputted into a speech audio generation module. The speech content data is associated with the state of the video game. The input data may further comprise speaker identifier data for a speaker of the generated speech audio. The speech audio generation module may comprise a neural network. The neural network may comprise a transformer network, a flow-based network or other suitable network architecture.

The speech audio generation module may include a synthesizer. The speech content data may comprise a plurality of speech content segments at a plurality of respective time steps. A speech content encoder of the synthesizer may output a speech content encoding for each time step of one or more time steps of the speech content data. The predicted prosodic features may comprise predicted prosodic features for each time step of the one or more time steps of the speech content data. Step 7.3 may comprise combining, for each time step of the one or more time steps, the speech content encoding and the prosodic features of the time step.

In step 7.4, an encoded representation of the speech content data dependent on the predicted prosodic features is generated using one or more encoders of the speech audio generator module. The one or more encoders may comprise a prosody encoder configured to generate an encoded representation of the predicted prosodic features, and a speech content encoder configured to generate the encoded representation of the speech content data based on the encoded representation of the predicted prosodic features.

In step 7.5, context-dependent speech audio is generated, based on the encoded representation, using a decoder of the speech audio generation module.

Figure 8:
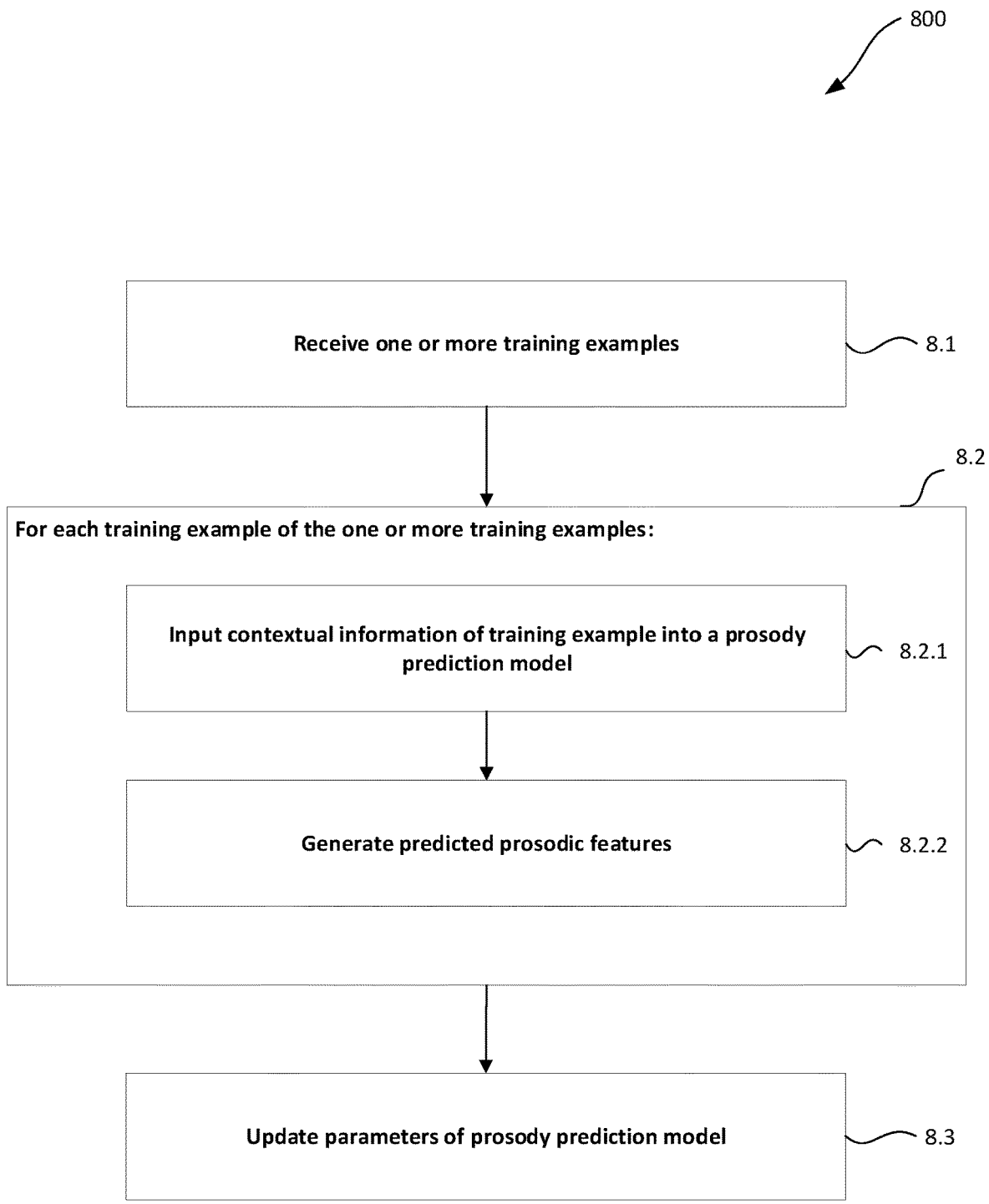
FIG. 8 is a flow diagram illustrating an example method of training a prosody predictor for use in generating context-dependent speech audio in a video game.

FIG. 8 is a flow diagram illustrating an example method 800 of training a prosody prediction model for use in generating context-dependent speech audio in a video game. FIG. 8 displays a general overview of the methods described in relation to FIGS. 4, 5, and 6.

In step 8.1, one or more training examples are received. Each training example comprises: (i) contextual information for a state of the video game, and (ii) ground-truth speech audio that is associated with the state.

Step 8.2 comprises steps 8.2.1, and 8.2.2, each of which are performed for each of the one or more training examples.

In step 8.2.1, the contextual information is inputted into the prosody prediction model.

In step 8.2.2, predicted prosodic features are generated as output of the prosody prediction model.

In step 8.3, parameters of the prosody prediction model are updated. The parameters of the prosody predictor are updated based on an objective function. The objective function is dependent on the predicted prosodic features and the ground-truth speech audio of each training example.

The prosody prediction model may be being trained separately to a speech audio generation model. In this case, the objective function may compare the predicted prosodic features with ground-truth prosodic features of each training example. The ground-truth prosodic features of a training example may be determined from the ground-truth speech audio of the training example. The ground-truth prosodic features may comprise one or more statistical features relating to a pitch contour. The one or more statistical features may comprise a mean, a variance, a maximum, and a minimum of the pitch contour. The ground-truth prosodic features may comprise one or more statistical features relating to a volume contour of the ground-truth speech audio of the training example. The one or more statistical features may comprise: a mean, a variance, and a maximum of the volume contour.

The method 800 may further involve updating parameters of a speech audio generation model that is being trained separately to the prosody prediction model. This may comprise receiving one or more further training examples. Each further training example may comprise: (i) ground-truth speech audio, and (ii) speech content data representing one or more utterances of the ground-truth speech audio. For each further training example of the one or more further training examples, the method may further comprise determining prosodic features from the ground-truth speech audio. Input data comprising the speech content data and the determined prosodic features may be inputted into the speech audio generation model. Predicted speech audio may be generated as output of the speech audio generation model. Parameters of the speech audio generation model may be updated based on a further objective function, wherein the further objective function comprises a comparison between the generated speech audio and the ground-truth speech audio of each training example.

Alternatively, the prosody predictor may be being trained jointly with a speech audio generation model. In this case, each training example may further comprise speech content data for the ground-truth speech audio. The method 800 may further comprise, for each training example of the one or more training examples: inputting, into the speech audio generation model, input data comprising the speech content data and the predicted prosodic features; and generating, as output of the speech audio generation model, the predicted speech audio. The parameters of the prosody prediction model and the speech audio generation model may be updated based on the objective function. The objective function may comprise a comparison between the generated speech audio and the ground-truth speech audio of each training example.

Figure 9:
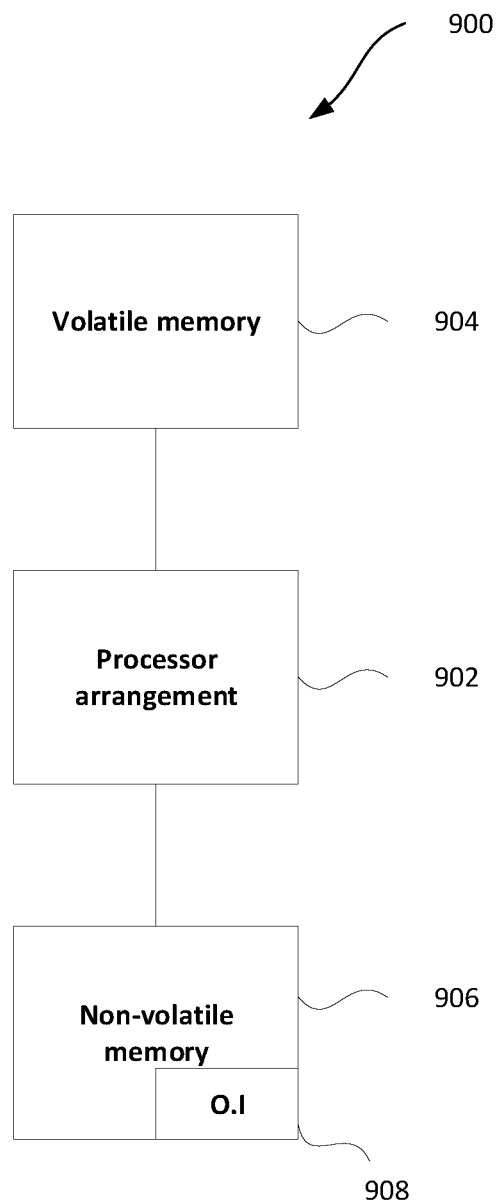
FIG. 9 shows a schematic example of a system/apparatus for performing any of the methods described herein.

FIG. 9 shows a schematic example of a system/apparatus for performing methods described herein. The system/apparatus shown is an example of a computing device. It will be appreciated by the skilled person that other types of computing devices/systems may alternatively be used to implement the methods described herein, such as a distributed computing system.

The apparatus (or system) 900 comprises one or more processors 902. The one or more processors control operation of other components of the system/apparatus 900. The one or more processors 902 may, for example, comprise a general purpose processor. The one or more processors 902 may be a single core device or a multiple core device. The one or more processors 902 may comprise a central processing unit (CPU) or a graphical processing unit (GPU). Alternatively, the one or more processors 902 may comprise specialised processing hardware, for instance a RISC processor or programmable hardware with embedded firmware. Multiple processors may be included.

The system/apparatus comprises a working or volatile memory 904. The one or more processors may access the volatile memory 904 in order to process data and may control the storage of data in memory. The volatile memory 904 may comprise RAM of any type, for example Static RAM (SRAM), Dynamic RAM (DRAM), or it may comprise Flash memory, such as an SD-Card.

The system/apparatus comprises a non-volatile memory 906. The non-volatile memory 906 stores a set of operation instructions 908 for controlling the operation of the processors 902 in the form of computer readable instructions. The non-volatile memory 906 may be a memory of any kind such as a Read Only Memory (ROM), a Flash memory or a magnetic drive memory.

The one or more processors 902 are configured to execute operating instructions 908 to cause the system/apparatus to perform any of the methods described herein. The operating instructions 908 may comprise code (i.e. drivers) relating to the hardware components of the system/apparatus 900, as well as code relating to the basic operation of the system/apparatus 900. Generally speaking, the one or more processors 902 execute one or more instructions of the operating instructions 908, which are stored permanently or semi-permanently in the non-volatile memory 906, using the volatile memory 904 to temporarily store data generated during execution of said operating instructions 908.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 9, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A computer-implemented method of generating context-dependent speech audio in a video game, the method comprising:
　　enabling, by at least one processor of a computing device, gameplay of the video game;
　　determining, by a video game engine of the video game on the at least one processor, an in-game event for which context-dependent speech audio is to be generated during the gameplay of the video game, wherein the in-game event includes an action performed by a character of the video game;
　　obtaining, by the video game engine of the video game, contextual information and speech content data relating to a current state of the gameplay;
　　requesting, by the video game engine of the video game, the context-dependent speech audio from a speech audio generator of the video game;
　　generating, by the speech audio generator responsive to the request, the context-dependent speech audio by:
　　　　inputting the contextual information relating to the current state of the gameplay into a prosody prediction model, wherein the prosody prediction model comprises a trained machine learning model which is configured to generate predicted prosodic features based on the contextual information;
　　　　generating, by the prosody prediction model, predicted prosodic features from the input contextual information;

inputting, into a speech audio generation model, input data comprising:
   at least the predicted prosodic features; and
   the speech content data relating to the current state of the gameplay;
generating, using one or more encoders of the speech audio generation model, an encoded representation of the speech content data dependent on the predicted prosodic features;
decoding, using a decoder of the speech audio generation model, the encoded representation to generate the context-dependent speech audio; and
causing, by the video game engine of the video game, the context-dependent speech audio that matches the current state of the video game to be played among the gameplay of the in-game event.

2. The computer-implemented method of claim 1, wherein the one or more encoders comprise a prosody encoder configured to generate an encoded representation of the predicted prosodic features, and a speech content encoder configured to generate the encoded representation of the speech content data based on the encoded representation of the predicted prosodic features.

3. The computer-implemented method of claim 1, wherein the video game is a sports video game, wherein obtaining the contextual information relating to the current state of the video game comprises determining contextual information relating to an in-progress match of the sports video game.

4. The computer-implemented method of claim 3, wherein the contextual information relating to the in-progress match of the sports video game comprises determining one or more of:
   statistics relating to one or more teams playing in the match;
   statistics relating to one or more players playing in the match;
   statistics relating to a current status of the match; and
   the type of sport being played in the match.

5. The computer-implemented method of claim 1, wherein the contextual information includes the speech content data associated with the current state of the video game.

6. The computer-implemented method of claim 1, wherein the input data further comprises speaker identifier data for a speaker of the generated speech audio.

7. A non-transitory computer-readable medium containing instructions, which when executed by one or more processors, causes the one or more processors to perform a method comprising:
   enabling, by at least one processor of a computing device, gameplay of a video game;
   determining, by a video game engine of the video game on the at least one processor, an in-game event for which context-dependent speech audio is to be generated during the gameplay of the video game, wherein the in-game event includes an action performed by a character of the video game;
   obtaining, by the video game engine of the video game, contextual information and speech content data relating to a current state of the gameplay;
   requesting, by the video game engine of the video game, the context-dependent speech audio from a speech audio generator of the video game;
   generating, by the speech audio generator responsive to the request, the context-dependent speech audio by:
      inputting the contextual information relating to the current state of the gameplay into a prosody prediction model, wherein the prosody prediction model comprises a trained machine learning model which is configured to generate predicted prosodic features based on the contextual information;
      generating, by the prosody prediction model, predicted prosodic features from the input contextual information;
      inputting, into a speech audio generation model, input data comprising:
         at least the predicted prosodic features; and
         the speech content data relating to the current state of the gameplay;
      generating, using one or more encoders of the speech audio generation model, an encoded representation of the speech content data dependent on the predicted prosodic features;
      decoding, using a decoder of the speech audio generation model, the encoded representation to generate the context-dependent speech audio; and
      causing, by the video game engine of the video game, the context-dependent speech audio that matches the current state of the video game to be played among the gameplay of the in-game event.

8. The non-transitory computer-readable medium of claim 7, wherein the speech audio generation model includes a synthesizer.

9. The non-transitory computer-readable medium of claim 8, wherein the speech content data comprises a plurality of speech content segments at a plurality of respective time steps and wherein inputting, into the speech audio generation model, the input data comprising the predicted prosodic features and the speech content data comprises generating, as output of a speech content encoder of the synthesizer, a speech content encoding for each time step of one or more time steps of the speech content data.

10. The non-transitory computer-readable medium of claim 9, wherein generating predicted prosodic features comprises generating predicted prosodic features for each time step of the one or more time steps of the speech content data.

11. The non-transitory computer-readable medium of claim 10, wherein inputting, into the speech audio generator, the input data comprising the predicted prosodic features and the speech content data comprises combining, for each time step of the one or more time steps, the speech content encoding and the predicted prosodic features of the time step.

12. A computer-implemented method of generating context-dependent speech audio in a video game, the method comprising:
   enabling, by at least one processor of a computing device, gameplay of the video game comprising requesting, by the at least one processor of the computing device, video game content from a video game server while a user is playing the video game;
   determining, by a video game engine of the video game on the at least one processor, an in-game event for which context-dependent speech audio is to be generated during the gameplay of the video game;
   obtaining, by the video game engine of the video game, contextual information and speech content data relating to a current state of the gameplay;
   requesting, by the video game engine of the video game, the context-dependent speech audio from a speech audio generator of the video game;

generating, by the speech audio generator responsive to the request, the context-dependent speech audio based upon processing the contextual information and speech content data relating to the current state of the gameplay by one or more machine learning models; and causing, by the video game engine of the video game, the context-dependent speech audio that matches the current state of the video game to be played among the gameplay of the in-game event.

13. The computer-implemented method of claim 12, wherein generating, by the speech audio generator responsive to the request, the context-dependent speech audio based upon processing the contextual information and speech content data relating to the current state of the gameplay by the one or more machine learning models comprises:

generating, using the one or more machine learning models, predicted prosodic features based upon the contextual information.

14. The computer-implemented method of claim 13, wherein generating, by the speech audio generator responsive to the request, the context-dependent speech audio based upon processing the contextual information and speech content data relating to the current state of the gameplay by the one or more machine learning models comprises:

generating, using the one or more machine learning models, the speech content data based upon the predicted prosodic features.

15. The computer-implemented method of claim 12, wherein the video game is a sports video game, wherein obtaining the contextual information relating to the current state of the video game comprises determining contextual information relating to an in-progress match of the sports video game.

16. The computer-implemented method of claim 15, wherein the contextual information relating to the in-progress match of the sports video game comprises determining one or more of:

statistics relating to one or more teams playing in the match;

statistics relating to one or more players playing in the match;

statistics relating to a current status of the match; and the type of sport being played in the match.

17. The computer-implemented method of claim 12, wherein the contextual information includes the speech content data associated with the current state of the video game.

18. The computer-implemented method of claim 12, wherein an input data further comprises speaker identifier data for a speaker of the generated speech audio.

19. A non-transitory computer-readable medium containing instructions, which when executed by one or more processors, causes the one or more processors to perform a method comprising:

enabling, by at least one processor of a computing device, gameplay of a video game comprising requesting, by the at least one processor of the computing device, video game content from a video game server while a user is playing the video game;

determining, by a video game engine of the video game on the at least one processor, an in-game event for which context-dependent speech audio is to be generated during the gameplay of the video game;

obtaining, by the video game engine of the video game, contextual information and speech content data relating to a current state of the gameplay;

requesting, by the video game engine of the video game, the context-dependent speech audio from a speech audio generator of the video game;

generating, by the speech audio generator responsive to the request, the context-dependent speech audio based upon processing the contextual information and speech content data relating to the current state of the gameplay by one or more machine learning models; and causing, by the video game engine of the video game, the context-dependent speech audio that matches the current state of the video game to be played among the gameplay of the in-game event.

20. The non-transitory computer-readable medium of claim 19, wherein generating, by the speech audio generator responsive to the request, the context-dependent speech audio based upon processing the contextual information and speech content data relating to the current state of the gameplay by the one or more machine learning models comprises:

generating, using the one or more machine learning models, predicted prosodic features based upon the contextual information.

\* \* \* \* \*